Feb. 12, 1963 J. A. PIETSCH 3,077,079
CONTROL ARRANGEMENT FOR THERMOELECTRIC APPARATUS
Filed Nov. 13, 1961
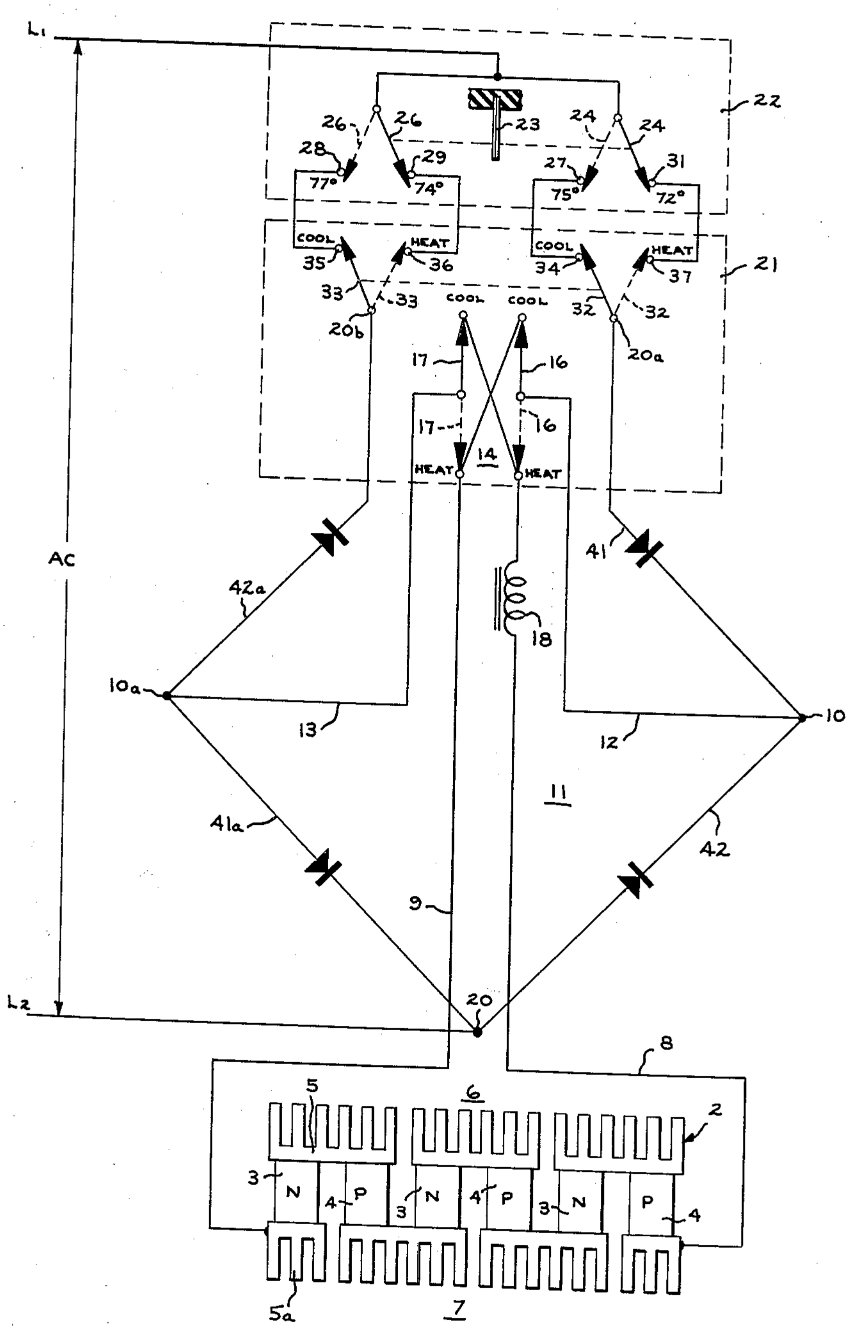
INVENTOR.
JOSEPH A. PIETSCH
BY [signature]
HIS ATTORNEY United States Patent Office 3,077,079
Patented Feb. 12, 1963

3,077,079

CONTROL ARRANGEMENT FOR THERMOELECTRIC APPARATUS

Joseph A. Pietsch, Louisville, Ky., assignor to General Electric Company, a corporation of New York Filed Nov. 13, 1961, Ser. No. 151,693
6 Claims. (Cl. 62—3)

The present invention relates to a thermoelectric apparatus for use in heating or cooling a space and is more particularly concerned with the efficient control of such apparatus to provide economical operation thereof in accordance with the heating or cooling requirements of the space.

While the present invention is particularly applicable to thermoelectric heating and cooling of an enclosure and, for this reason will be described in connection with apparatus designed to provide heating or cooling for an enclosure, it will be understood that the control arrangement of the present invention may also be utilized in connection with thermoelectric devices designed only for heating purposes, such as a water heating device, or for cooling purposes only such as a liquid chiller.

A thermoelectric heating and cooling unit in its simplest form comprises an array of thermoelectric junctions connected in series circuit relationship so that, when a direct current is passed therethrough, alternate junctions of the array are either hot or cold. The junctions are physically arranged so that all of the hot junctions are exposed to one ambient and all of the cold junctions are exposed to another ambient. The above type of arrangement is sometimes called a thermopile. In proposed types of heating and cooling devices, the thermopile is mounted so that the junctions on one side thereof are exposed to air from an enclosure and the opposite or dissimilar thermal junctions are exposed to air from outside the enclosure. When a direct current is passed in a predetermined direction through the thermopile, heat is absorbed by the thermoelectric junctions exposed to the enclosure and dissipated by the thermoelectric junctions exposed to the outside and, when the direction of current flow is reversed, heat is absorbed by the junctions exposed to the outside air and dissipated at the junctions exposed to air from the enclosure. Thus, the thermopile operates as a heat pump and the direction of heat flow through the thermopile may be effectively controlled merely by controlling the polarity of the current flowing therethrough.

It is well known in the art that the most economical way to heat or cool an enclosure with a heat pump, i.e. a device for absorbing heat from one ambient and delivering it to another, is to maintain as small as possible a temperature difference between the heat exchangers used respectively to absorb and dissipate heat. Under these conditions, the amount of heat transferred via the heat pump per unit power input is at a maximum. This is generally true of both thermoelectric heat pumps as well as heat pumps using the vapor compression cycle. In a system with fixed heat exchangers, the temperature difference between the heat source and heat sink is decreased as the heat pumping rate is reduced, and additionally the power input to the system drops disproportionately so that a substantial increase in the economy of operation results.

For example, a heat pump having an outdoor heat exchanger operating at perhaps 130° F. and an indoor heat exchanger operating at perhaps 50° F. might provide a predetermined number of cooling units output, such as 7,000 B.t.u./hour for a predetermined power input of perhaps 2,000 watts. A reduction in the pumping rate, say to 5,000 B.t.u./hour might result in the lowering of the outdoor heat exchange temperature to 110° F. and raise the temperature of the indoor heat exchanger to perhaps 60° F. and drop the power required to 1,000 watts. Thus a reduction in pumping rate causes a decrease in the temperature differential between the opposite heat exchangers of the heat pump, which results in a disproportionate drop in power input and is, therefore, much more economical to operate.

Most conditioning devices are designed with a capacity calculated to satisfy the maximum heating and cooling requirements of an enclosure. At other than maximum conditions, the device has excess capacity and the system is modulated by cycling the unit. That is, the conditioning unit or heat pump operates at a maximum capacity for a short period of time, using a relatively large and uneconomical power input, and is then idle until the thermostat or temperature sensing device again energizes the conditioner. It is, of course, more desirable to design the conditioning system so that it may be operated at a maximum capacity only when required to bring the temperature within a suitable temperature range, and then to operate the system at low capacity and at a much more economical power input to maintain enclosure temperature within the desired temperature range.

Accordingly, it is an object of the present invention to provide a control arrangement for a thermoelectric heating and cooling apparatus designed to promote economical operation of the apparatus.

Another object of the present invention is to provide a control arrangement designed to operate a thermoelectric heating and cooling apparatus at a relatively low capacity for greater periods of time to maintain the temperature within an enclosure at satisfactory range and to operate the apparatus at high capacity for relatively short periods only when the heating or cooling load of the enclosure is unusually high.

A more specific object of the present invention is to provide a thermoelectric heating and cooling apparatus incorporating an arrangement for reducing the power input to the apparatus when low capacity output is required and increasing power input to the apparatus when high capacity output is required.

Further objects and advantages of the present invention will become apparent as the following description proceeds and the features of novelty which characterize the invention will be pointed out with particularity in the claims annexed to and forming a part of this specification.

In accordance with the present invention there is provided a thermoelectric heat pump for heating and cooling air within an enclosure including a thermopile having a plurality of thermoelectric junctions arranged in heat exchange relationship with air from the enclosure. In order to convert A.C. power to the D.C. power necessary for operation of the thermoelectric heat pump, a rectifier is provided which includes a half-wave rectification circuit and a full-wave rectification circuit. Means are provided for electrically connecting the output terminals of the rectifier across the thermopile. In order to adjust the power input to the thermopile, there is provided a switch means adapted to connect the source of A.C. power across either the half-wave rectification circuit or across the full-wave rectification circuit. The switch means is controlled by means responsive to the temperature of the enclosure, which sequentially actuates the switch means to energize the rectification circuits according to predetermined temperature changes in the enclosure.

For a better understanding of the invention, reference may be had to the accompanying drawing, the single figure of which comprises a line diagram schematically illustrating the thermopile and the control arrangement of the present invention.

Referring now to FIGURE 1 of the drawing, there is shown a thermopile 2 and the control arrangement of the present invention. Generally speaking, the thermopile comprises an array of thermal junctions of series connected elements having dissimilar thermoelectric properties. In the drawing, the thermoelectric elements 3 and 4 are designated either N or P. The N and P nomenclature is prevalent in semiconductor terminology at present and is used herein for convenience in differentiating materials having dissimilar thermoelectric properties. An N material includes an abundance of electrons. A P material includes an abundance of electron vacancies or holes. A thermocouple is formed when an element 3 of N type material is joined to an element 4 of P type material. In most heating and cooling devices, and in the embodiment shown in the drawing, the N and P type elements 3 and 4 are connected in series by means of suitable conductor links 5 and 5*a* of thermally and electrically conductive material, such as copper.

When the thermocouple is assembled and a direct current is passed through the thermocouple in the positive direction, i.e. from N to P, the junction between the N and P material becomes cold. Thus, when a direct current is passed through the series connected assembly of the drawing in the left to right direction, the conductor links 5, forming one side of the thermopile, become cold. Also, when current flows from left to right through assembly, the copper links 5*a*, which comprise the other side of the thermopile 2 and form the P to N junctions, become hot. When current flows through the assembly shown in the drawing from the P element on the right toward the left, then the copper links 5 form the P to N and become hot and the conductor links 5*a* form the N to P junctions and become cold. Thus, one side of the thermopile 2 is hot and dissipates heat while the other side is cold and absorbs heat, depending upon the direction or polarity of the direct current flowing therethrough.

In operation the thermopile is mounted so that all of the junctions formed on one side, such as the junctions formed by the conductor members 5, are arranged in heat exchange relation with the article or air which is to be heated or cooled, which is designated generally by the reference numeral 6. The opposite side of the thermopile, which in the illustrated embodiment is formed by the conductor links 5*a* is exposed to another ambient or heat sink, such as the outdoor air or other source of heating or cooling which is designated by the reference numeral 7. It is generally the practice to circulate indoor and outdoor air respectively over the opposite sides of the thermopile by means of fans or other type air moving devices. In order to provide better heat transfer between the respective sides of the thermopile and the air flowing thereover the conductor links are provided with a plurality of fins which, of course, may take on any desired shape.

Direct current is supplied to the thermopile through lines 8 and 9 connecting respectively with the opposite ends of the series connected array of thermoelectric junctions. Power for operation of the thermopile is originally derived from a source of A.C. power, such as the A.C. power supply found in most present day household circuits, and means are provided for converting the alternating current of the household circuit to direct current which is, of course, required to operate the thermopile 2. This means comprises a rectifier, generally designated by the reference numeral 11. The output terminals of the rectifier are connected across the thermopile 2. More specifically, lines 12 and 13 leading from the rectifier output terminals 10 and 10*a* connect through a heating and cooling selector switch 14 to the lines 8 and 9 leading to the thermopile. Switch 14 forms a part of a selector member 21 which is usually provided in a heat pump to permit the occupant of the enclosure to select the type of operation desired. In some arrangements, actuation of the selector member 21, and the switches found therein, is performed automatically by a temperature responsive control, such as by the temperature sensing device of the room thermostat. For ease of explanation, however, the selector member 21 is shown separately from the thermostat and the switches of this member are illustrated as being actuated separately from those in the thermostat. The selector member 21 includes a pair of switches 16 and 17 adapted to reverse the current flow to the thermopile according to the desires of the occupant of the enclosure. For example, when the switches 16 and 17 are connected as shown in solid lines in the drawing, the thermopile is arranged to cool the enclosure 6. That is, the current is connected through line 9 to the thermopile and the N to P junctions are made through the conductor links 5 arranged on the enclosure side of the thermopile. When the switches 16 and 17 are reversed, as shown in the dotted line position of the drawing, the direct current flow through the thermopile is reversed and the current flows toward the thermopile through line 8 and the conductor links 5 then make the P to N junctions of the thermopile and are hot during flow of current in this direction.

In order to reduce the ripple of the rectified direct current filter means 18 is connected into the series circuit or line 8 leading from the thermopile. In the drawing, the filter 18 is shown as inductive filter but may comprise a capacitive or other well known type of filter for reducing the variations of the rectified direct current supplied to the lines 8 and 9.

Means are provided for connecting the input terminals of the rectifier across a source of A.C. power such as that found in the regular household circuit and illustrated in the drawing as lines $L_1$ and $L_2$. The line $L_2$ is connected through the input terminal 20 of the rectifying means and $L_1$ is connected to split input terminals 20*a* and 20*b* of the rectifier through the selector switch member 21 and a temperature responsive switch means or thermostat designated 22. In the preferred embodiment of the invention, the thermostat 22 comprises a two-pole thermostat adapted to energize two separate circuits as the temperature rises or falls within an enclosure. For ease of explanation, the separate contacts of the thermostat switches have been supplied with temperature notations indicating the temperature at which the respective switch arms are actuated to engage the contacts. It will be understood that these temperatures are only representative and that in actual practice the particular temperatures will be selected by the operator.

The switches are actuated by a temperature sensing means, schematically illustrated by the bimetal member 23. The temperature responsive means or bimetal 23 is adapted to sequentially actuate a pair of switches 24 and 26 in accordance with predetermined temperature changes in the enclosure 6. The thermostat is normally arranged within the enclosure to be conditioned and the thermal sensing member or bimetal member 23 is exposed to the temperature of the enclosure so that it controls, within limits the temperature of the air therein. As shown schematically in the drawing, the bimetal 23 is adapted to actuate the first switch or lower temperature switch 24 against a contact 27 as the temperature in the enclosure rises to perhaps 75°, which temperature as stated previously may be adjusted by the occupant of the enclosure. If the temperature within the enclosure continues to rise, the second switch or upper termperature switch 26 is actuated by the bimetal member 23 to engage the contact 28 at a temperature of 77°. The increment or temperature range between the actuation of contacts 27 and 28 is two degrees Fahrenheit, however, this may be adjusted to provide a greater or lesser increment as may be desired. When conditions are such that heat must be supplied to the enclosure and the temperature within the enclosure drops to a lower temperature of say 74°, for example, the switch 26 is then operated by the bimetal 23 to engage the contact 29. If the temperature of the enclosure drops still further, the bimetal actuates the switch 24 to engage the contact 31. Thus, contacts 29 and 31 are sequentially actuated by the switches 26 and 24 respectively as the temperature within the enclosure drops from an upper limit of 74° to a lower limit of 72°. Thus, the thermostat 22 is adapted to energize pairs of switches sequentially according to temperature rises within the enclosure or according to temperature decreases in the enclosure in order to energize two separate circuits leading to the heating or cooling unit to provide heating and cooling for the enclosure, as will be hereinafter explained.

The selector member also includes a pair of switches 32 and 33, which are preferably moved by the operator simultaneously with the actuation of switches 16 and 17 of the selector member which reverse the current to the thermopile. Switches 32 and 33 are designed to connect the proper contacts of the thermostat 22 to the respective circuits of the rectifier in order to properly energize the thermopile according to temperature rises in the enclosure or temperature decreases in the enclosure so that heating or cooling results, according to the wishes of the operator. As is illustrated in the drawing, switch contacts 34, 35, 36 and 37 of the selector switch member connect respectively with the contacts 27, 28, 29, and 31 of the thermostat. Obviously, the functions performed by these contacts could be accomplished in a single thermostatic device adapted to make the proper circuit connections for the heating and cooling operations. Thermostats of this type are well known in the art and a description thereof is not believed necessary for a full understanding of the invention. For ease of explanation, however, switches 32 and 33 and contacts 34, 35, 36 and 37 are included as a part of selector member 21 and will be assumed to be operated simultaneously with the current reversing switch 14. As mentioned previously switches 32 and 33 are connected respectively to the split input terminal designated 20*a* and 20*b* of the rectifier 11 and connect the rectifier for half-wave rectification or full-wave rectification as will be hereinafter explained.

First, consider the condition when the thermopile is operated for cooling the enclosure 6, and the temperature within the enclosure begins to rise from the temperature below perhaps 75° F. When the temperature reaches 75° F. the switch 24 is moved across the contact 27 thereby energizing the half-wave rectification circuit of the rectifying means 11. Alternating current flows through the selector switch 32, which is adjusted in the cool position, or the full line position of the drawing, to the terminal 20*a* of the rectifier 11. The alternating current is converted to half-wave direct current in the arm 41 of the rectifier and is delivered at the output terminal 10 to the line 12 where it flows through the reversing switch 16 to the line 9 leading to the thermopile. Current is conducted from the thermopile through the line 8, back through the reversing switch 17 to the line 13, where it flows through the opposite arm 41*a* of the half-wave rectification circuit which connects through the input terminal 20 with line $L_2$ of the A.C. power source. If the amount of cooling delivered at the cooling junctions or conductor links 5 is sufficient to maintain the enclosure temperature within the range between 75° to 77°, the unit continues to operate on half-wave rectification and consumes only that amount of power supplied by the half-wave rectification circuit.

However, if the temperature within the enclosure rises to 77°, then the thermostat switch 26 engages the contact 28 and connects the rectifier 11 so that it includes a full-wave rectification circuit. The alternating current from the source of A.C. power current then flows through the line $L_2$ and arm 42 of the rectification circuit to the input terminal 10 and thence through the line 12, reversing switch 16 and line 9 to the thermopile. Current is then delivered back through the line 8 and reversing switch 17 to the line 13 and the output terminal 10*a* to the opposite arm 42*a* of the full-wave rectification circuit where it flows to the line $L_1$ through the switch 33 of the selector member and the thermostat switch 26.

It is well known that the average current supplied by means of a half-wave rectification circuit is approximately ½ of that supplied by a full-wave rectification circuit and thus, the power consumed during half-wave rectification is substantially half of that consumed during full-wave rectification. Of course, the total quantity of heat removed at the indoor side of the heat pump is substantially less during half-wave rectification than that removed during full-wave rectification, but the quantity of heat removed per watt or unit power consumed by the thermopile is substantially greater during half-wave rectification than during full-wave rectification.

The heating cycle control is substantially the same as that disclosed for cooling cycle. During heating, the selector means 21 is adjusted by the operator so that the switches therein are arranged in the dotted line position as shown in the drawing. When the reversing switch means 14 is arranged so that reversing switch arms 16 and 17 are in their dotted line positions of the drawing, direct current is supplied to the thermopile through the line 8 and carried back to the rectifier through the line 9.

When the temperature in the enclosure is below a predetermined temperature, such as 72° F. as indicated adjacent contact 31 of the drawing, then both of the switch arms 24 and 26 are moved by the bimetal 23 to engage heating contacts 31 and 29 respectively. This connects the rectifier 11 across the A.C. power source and energizes the full-wave rectification circuit to supply fully rectified direct current to the thermopile 2 through the line 8. As the temperature of the enclosure rises above a temperature (72° F.) which is a predetermined increment below that temperature set on the thermostat 22 by the occupant, then the bimetal 23 causes switch 24 to disengage from contact 31 thereby connecting the rectifier 11 for half-wave rectification of the alternating current.

As long as the temperature remains between 72° F. and 74° F. half-wave rectification of the power supply will continue until the temperature reaches 74° F. when the bimetal sensing means 23 will then move the switch 26 to disengage the contact 29 thereby completely de-energizing the system. A description of the current flow for the respective circuits during the heating operation is not deemed necessary inasmuch as they are similar to those utilized during the cooling operation.

In the above-described manner, the full-wave current of the A.C. power supply is converted to direct current and supplied to the thermopile whenever the cooling or heating load within the enclosure is relatively great as determined by the thermostat 22 within the enclosure. However, whenever the temperature within the enclosure approaches within a predetermined increment, such as 2° F., of that which is set by the occupant, then the thermostat automatically connects the rectifier to supply half wave rectified direct current to the thermopile so that it consumes correspondingly less power. If the cooling or heating output of the thermopile under half-wave rectified current is sufficient to maintain the temperature of the enclosure close to that required by the thermostat, then the unit operates economically at this reduced power until it satisfies the conditions called for on the thermostat. If the heat load or cooling load is such as to require greater output from the thermopile, then both of the thermostat switches are closed across their respective contacts to connect the rectifier to provide full-wave rectification of the power supply and automatically increases the output of the thermopile at a sacrifice in operating economy. The above-described control arrangement for a thermoelectric heating and cooling device is designed to take advantage of the operating economy that can be achieved by substantially reducing the power input to the device to provide reduced heating or cooling when the enclosure temperature is such as to warrant this type of operation.

While in accordance with the patent statutes there has been described what at present is considered to be the preferred embodiment of the invention, it will be understood by those skilled in the art that various changes and modifications may be made therein without departing from the invention, and it is, therefore, the aim of the appended claims to cover all such changes and modifications as fall within the true spirit and scope of the invention.

What I claim as new and desire to secure by Letters Patent of the United States is:

1. A thermoelectric heat pump utilizing the Peltier effect for heating or cooling a space comprising a thermopile having one side adapted to absorb heat from or dissipate heat into said space and another side adapted to dissipate heat into or absorb heat from an ambient separated from said space when a direct current is passed through said thermopile, a rectifier for converting alternating current from a source of A.C. power to direct current and including output teminals adapted to be connected across said thermopile to supply a direct current thereto, said rectifier including a half-wave rectification circuit and a full-wave rectification circuit, switch means movable between at least two positions for connecting said half-wave rectification circuit to said source of A.C. power when said switch is in one position and for connecting said full-wave rectification circuit to said source of A.C. power when said switch is in another of said positions, and means responsive to the temperature of said space for sequentially actuating said switch means to energize said rectification circuits according to predetermined temperature changes in said space.

2. A thermoelectric heat pump utilizing the Peltier effect for heating or cooling air within an enclosure comprising a thermopile having one side arranged in heat exchange relationship with air from said enclosure and another side arranged in heat exchange relationship with air from the outdoors, a rectifier for converting alternating current from a source of A.C. power to direct current and including output terminals adapted to be connected across said thermopile to supply a direct current thereto, said rectifier including a half-wave rectification circuit and a full-wave rectification circuit, a thermostat responsive to the temperature of air within said enclosure, said thermostat including switch means adapted to energize said half-wave rectification circuit when said temperature of said enclosure air is at a predetermined temperature and to energize said full-wave rectification circuit when said temperature of said enclosure air is at a second predetermined temperature.

3. A thermoelectric heat pump utilizing the Peltier effect for heating or cooling air within an enclosure comprising a thermopile having one side adapted to absorb heat from or dissipate heat into said enclosure while another side thereof dissipates heat into or absorbs heat from an ambient separate from said enclosure when a direct current is passed through said thermopile, a rectifier for converting alternating current from a source of A.C. power to direct current and including output terminals for supplying a direct current, reversing switch means electrically connected between said output terminals of said rectifier and said opposite sides of said thermopile for selectively reversing the polarity of the current flowing through said thermopile thereby to condition said thermopile to heat or cool said enclosure, said rectifier including a half-wave rectification circuit and a full-wave rectification circuit, switch means movable between at least two positions for connecting said half-wave rectification circuit to said source of A.C. power when said switch means is in one position and connecting said full-wave rectification circuit to said source of A.C. power when said switch means is in another of said positions, and means responsive to the temperautre of said enclosure for sequentially actuating said switch means to energize said rectification circuits according to predetermined temperature changes in said enclosure.

4. A thermoelectric heat pump utilizing the Peltier effect for cooling air within an enclosure comprising a thermopile having one side adapted to absorb heat from said enclosure while another side thereof dissipates heat into an ambient separate from said enclosure when a direct current is passed through said thermopile, a rectifier for converting alternating current from a source of A.C. power to direct current and including output terminals adapted to be connected across said thermopile to supply a direct current thereto, said rectifier including a half-wave rectification circuit and a full-wave rectification circuit, a thermostat including switch means connecting with a source of A.C. power and adapted to energize said half-wave rectification circuit when said temperature of said enclosure is at a first predetermined temperature and to energize said full-wave rectification circuit when said temperature of said enclosure rises a predetermined differential above said first predetermined temperature thereby providing low power input to said thermopile when said temperature within said enclosure is only slightly above said predetermined temperature and supplying high power input to said thermopile when said temperature of said enclosure is greater than said predetermined differential above said predetermined temperature.

5. A thermoelectric heat pump utilizing the Peltier effect for heating and cooling air within an enclosure comprising a thermopile having one side arranged in heat exchange relationship with air from said enclosure and another side arranged in heat exchange relationship with air from the outdoors, a rectifier for converting alternating current from a source of A.C. power to direct current and including output terminals adapted to be connected across said thermopile to supply a direct current thereto, said rectifier including a half-wave rectification circuit and a full-wave rectification circuit, a thermostat including switch means adapted to energize said half-wave rectification circuit when said temperature of said enclosure is at a first predetermined temperature and to energize said full-wave rectification circuit when said temperature of said enclosure rises a predetermined differential above said first predetermined temperature, said thermostat including switch means adapted to energize said half-wave rectification circuit at a second predetermined temperature and to energize said full-wave rectification circuit when said temperature of said enclosure drops a predetermined differential below said second predetermined temperature, and selector control means for adjusting said thermostat to sequentially energize said rectification circuits according to temperature rises in said enclosure and according to temperature decreases in said enclosure.

6. A control apparatus adapted to control the power input to a thermoelectric heating or cooling device comprising a rectifier for converting alternating current from a source of A.C. power to direct current including an output terminal adapted to be connected across said thermoelectric device to supply a direct current thereto, said rectifier including a half-wave rectification circuit and a full-wave rectification circuit, switch means adapted for movement between at least two positions for connecting said half-wave rectification circuit to said A.C. power when said switch is in one position and connecting said full-wave rectification circuit to said source of A.C. power when said switch is in another of said positions, and means responsive to the temperature conditions affected by the output of said thermoelectric heating or cooling device for actuating said switch means to energize either said half-wave rectification circuit or said full-wave rectification circuit according to predetermined changes in said temperature conditions affected by the output of said thermoelectric heating or cooling device.

References Cited in the file of this patent

UNITED STATES PATENTS

| | | |
|---|---|---|
| 2,777,107 | Medlar | Jan. 8, 1957 |
| 2,859,398 | Johnson | Nov. 4, 1958 |
| 2,922,284 | Danielson | Jan. 26, 1960 |